(12) United States Patent
Shpunt et al.

(10) Patent No.: US 8,786,757 B2
(45) Date of Patent: Jul. 22, 2014

(54) WIDEBAND AMBIENT LIGHT REJECTION

(75) Inventors: Alexander Shpunt, Tel Aviv (IL); Niv Gilboa, Tel Aviv (IL); Haim Bezdin, Rishon Lezion (IL)

(73) Assignee: Primesense Ltd., Tel Aviv (IL)

( * ) Notice: Subject to any disclaimer, the term of this patent is extended or adjusted under 35 U.S.C. 154(b) by 701 days.

(21) Appl. No.: 13/031,627

(22) Filed: Feb. 22, 2011

(65) Prior Publication Data

US 2011/0205421 A1    Aug. 25, 2011

Related U.S. Application Data

(60) Provisional application No. 61/306,980, filed on Feb. 23, 2010, provisional application No. 61/374,373, filed on Aug. 17, 2010.

(51) Int. Cl.
*H04N 9/07* (2006.01)
*G01J 3/28* (2006.01)
*G02B 9/00* (2006.01)
*G02B 27/10* (2006.01)

(52) U.S. Cl.
CPC ................................. *G02B 27/1066* (2013.01)
USPC ............................. 348/336; 356/328; 359/738

(58) Field of Classification Search
CPC .................................................. G02B 27/1066
USPC .............. 348/46, 47, 336; 356/328; 345/427; 359/738; 382/154; 600/310
See application file for complete search history.

(56) References Cited

U.S. PATENT DOCUMENTS

| 4,832,448 | A | 5/1989 | Jones |
| 5,685,358 | A | 11/1997 | Kawasaki et al. |
| 6,476,851 | B1 | 11/2002 | Nakamura |
| 6,507,442 | B2 | 1/2003 | Kashima et al. |
| 6,751,344 | B1* | 6/2004 | Grumbine ..................... 382/154 |
| 7,006,141 | B1 | 2/2006 | Neil et al. |
| 7,110,034 | B2 | 9/2006 | Suda |
| 2003/0067538 | A1* | 4/2003 | Myers ............................. 348/47 |
| 2005/0162649 | A1* | 7/2005 | Kryszczynski et al. ...... 356/328 |
| 2006/0100490 | A1* | 5/2006 | Wang et al. .................... 600/310 |
| 2006/0176580 | A1* | 8/2006 | Kirkham ........................ 359/738 |
| 2007/0057946 | A1* | 3/2007 | Albeck et al. ................. 345/427 |
| 2008/0240502 | A1 | 10/2008 | Freedman et al. |
| 2011/0255051 | A1 | 10/2011 | McCabe et al. |

FOREIGN PATENT DOCUMENTS

WO    0133200 A1    5/2001
WO    2007105205 A2    9/2007

OTHER PUBLICATIONS

U.S. Appl. No. 13/351,242 Office Action dated Oct. 7, 2013.
U.S. Appl. No. 61/433,536, filed Jan. 18, 2011.
U.S. Appl. No. 61/439,888, filed Feb. 6, 2011.

* cited by examiner

*Primary Examiner* — Gims Philippe
(74) *Attorney, Agent, or Firm* — D. Kligler I.P. Services Ltd.

(57) ABSTRACT

Optical apparatus includes an image sensor and objective optics, which are configured to collect and focus optical radiation over a range of wavelengths along a common optical axis toward a plane of the image sensor. A dispersive element is positioned to spread the optical radiation collected by the objective optics so that different wavelengths in the range are focused along different, respective optical axes toward the plane.

32 Claims, 5 Drawing Sheets

＝＝＝ PAGE ＝＝＝

WIDEBAND AMBIENT LIGHT REJECTION

CROSS-REFERENCE TO RELATED APPLICATIONS

This application claims the benefit of U.S. Provisional Patent Application 61/306,980, filed Feb. 23, 2010, and of U.S. Provisional Patent Application 61/374,373, filed Aug. 17, 2010, both of which are incorporated herein by reference.

FIELD OF THE INVENTION

The present invention relates generally to optical systems and devices, and specifically to techniques for capturing images of narrowband features against a background of ambient light.

BACKGROUND OF THE INVENTION

Computer vision systems in a variety of applications operate by projecting light onto an object and then detecting the light reflected back from the object. For example, three-dimensional (3D) mapping systems commonly project a pattern of structured light or short pulses of light onto an object and then extract 3D contours from an image of the patterned or pulsed light.

One system of this sort is described, for example, in U.S. Patent Application Publication 2008/0240502, whose disclosure is incorporated herein by reference. This publication describes apparatus for mapping an object using an illumination assembly, which includes a transparency containing a fixed pattern of spots. A light source transilluminates the transparency with optical radiation so as to project the pattern onto the object. An image capture assembly captures an image of the pattern that is projected onto the object. A processor processes the image captured by the image capture assembly so as to reconstruct a 3D map of the object. The image capture assembly may comprise a bandpass filter, which is chosen and positioned so that the image sensor receives light in the emission band of the light source, while filtering out ambient light that might otherwise reduce the contrast of the image of the projected pattern that is captured by the sensor.

SUMMARY OF THE INVENTION

Embodiments of the present invention that are described hereinbelow provide methods and apparatus that may be used to improve the quality of images formed with narrowband optical radiation.

There is therefore provided, in accordance with an embodiment of the present invention, optical apparatus, including an image sensor and objective optics, which are configured to collect and focus optical radiation over a range of wavelengths along a common optical axis toward a plane of the image sensor. A dispersive element is positioned to spread the optical radiation collected by the objective optics so that different wavelengths in the range are focused along different, respective optical axes toward the plane.

In disclosed embodiments, the dispersive element is configured to cause the image sensor to capture a sharp image of the optical radiation emitted from an object at a target wavelength within the range, while spreading broadband background radiation within the range across the plane.

In one embodiment, the apparatus includes a projection assembly, which is configured to project the optical radiation at the target wavelength onto the object, so that the emitted optical radiation collected by the objective includes the projected optical radiation that is reflected from the object. The projected optical radiation may include a predetermined radiation pattern, and the sharp image captured by the image sensor may include an image of the pattern projected onto the object.

In some embodiments, the apparatus includes a processor, which is configured to process the sharp image captured by the image sensor while rejecting interference caused by the background radiation. The processor may be configured to construct a 3D map of the object by processing the sharp image.

In some embodiments, the dispersive element includes a diffractive element, such as a grating. In one embodiment, the grating is configured to direct a selected diffraction order onto the image sensor, and the apparatus includes an interference filter positioned between the grating and the image sensor so as to block stray diffraction orders, other than the selected diffraction order, from reaching the image sensor. Alternatively or additionally, the dispersive element includes a refractive element.

Typically, the dispersive element is configured so that the optical radiation is focused with a chromatic aberration in excess of one micrometer per nanometer of wavelength at the plane of the image sensor.

In a disclosed embodiment, the dispersive element has a first tilt relative to the optical axis, and the apparatus includes a wedged lens, which is configured to focus the optical radiation with a second tilt, opposite to the first tilt. The wedged lens may include a section of an axially-symmetrical lens.

There is also provided, in accordance with an embodiment of the present invention, optical apparatus, including a projection assembly, which is configured to project optical radiation at a target wavelength onto an object. An imaging assembly includes an image sensor and optics, which are configured to collect and focus the optical radiation reflected from the object, along with background radiation over a range of wavelengths, toward a plane of the image sensor. The optics include a dispersive element, which is configured to direct the collected optical radiation so as to form a sharp image of the optical radiation at the target wavelength in the plane of the image sensor, while spreading the background radiation across the plane. A processor is configured to process the sharp image captured by the image sensor while rejecting interference caused by the background radiation.

In one embodiment, the projected optical radiation includes a predetermined radiation pattern, the sharp image captured by the image sensor includes an image of the pattern projected onto the object, and the processor is configured to construct a 3D map of the object by processing the sharp image.

Typically, the dispersive element is configured to spread the optical radiation collected by the optics so that different wavelengths in the range are focused along different, respective optical axes toward the plane of the image sensor.

In one embodiment, the dispersive element includes a dispersive focusing element, such as a diffractive lens, which is configured to focus the radiation at the target wavelength onto the plane of the image sensor, while other wavelengths in the range are focused ahead of or behind the plane.

The apparatus may include a motion mechanism, which is configured to shift a position of one or more elements of the optics relative to the plane so as to select the target wavelength that is to be imaged sharply in the plane.

There is additionally provided, in accordance with an embodiment of the present invention, optical apparatus, including an image sensor and objective optics, which are configured to collect and focus optical radiation over a range of wavelengths toward a plane of the image sensor. The objective optics include a dispersive element configured so that the optics have a chromatic aberration in excess of one micrometer per nanometer of wavelength at the plane.

The optics may be configured so that the chromatic aberration causes different wavelengths in the range originating from a given object point to focus at different, respective image points along an axis perpendicular to the plane. Alternatively or additionally, the optics may be configured so that the chromatic aberration causes different wavelengths in the range originating from a given object point to focus along different, respective axes.

There is further provided, in accordance with an embodiment of the present invention, a method for imaging, which includes collecting and focusing optical radiation over a range of wavelengths along a common optical axis toward a plane of an image sensor. A dispersive element is positioned to spread the collected optical radiation so that different wavelengths in the range are focused along different, respective optical axes toward the plane.

There is moreover provided, in accordance with an embodiment of the present invention, a method for imaging, which includes projecting optical radiation at a target wavelength onto an object. The optical radiation reflected from the object is collected and focused, along with background radiation over a range of wavelengths, toward a plane of an image sensor. A dispersive element is positioned to direct the collected optical radiation so as to form a sharp image of the optical radiation at the target wavelength in the plane of the image sensor, while spreading the background radiation across the plane. The sharp image captured by the image sensor is processed while rejecting interference caused by the background radiation.

There is furthermore provided, in accordance with an embodiment of the present invention, a method for imaging, which includes collecting and focusing optical radiation over a range of wavelengths along an optical path toward a plane of an image sensor. A dispersive element is positioned in the optical path so that the radiation is focused with a chromatic aberration in excess of one micrometer per nanometer of wavelength at the plane.

The present invention will be more fully understood from the following detailed description of the embodiments thereof, taken together with the drawings in which:

DETAILED DESCRIPTION OF EMBODIMENTS

Overview

Figure 1:
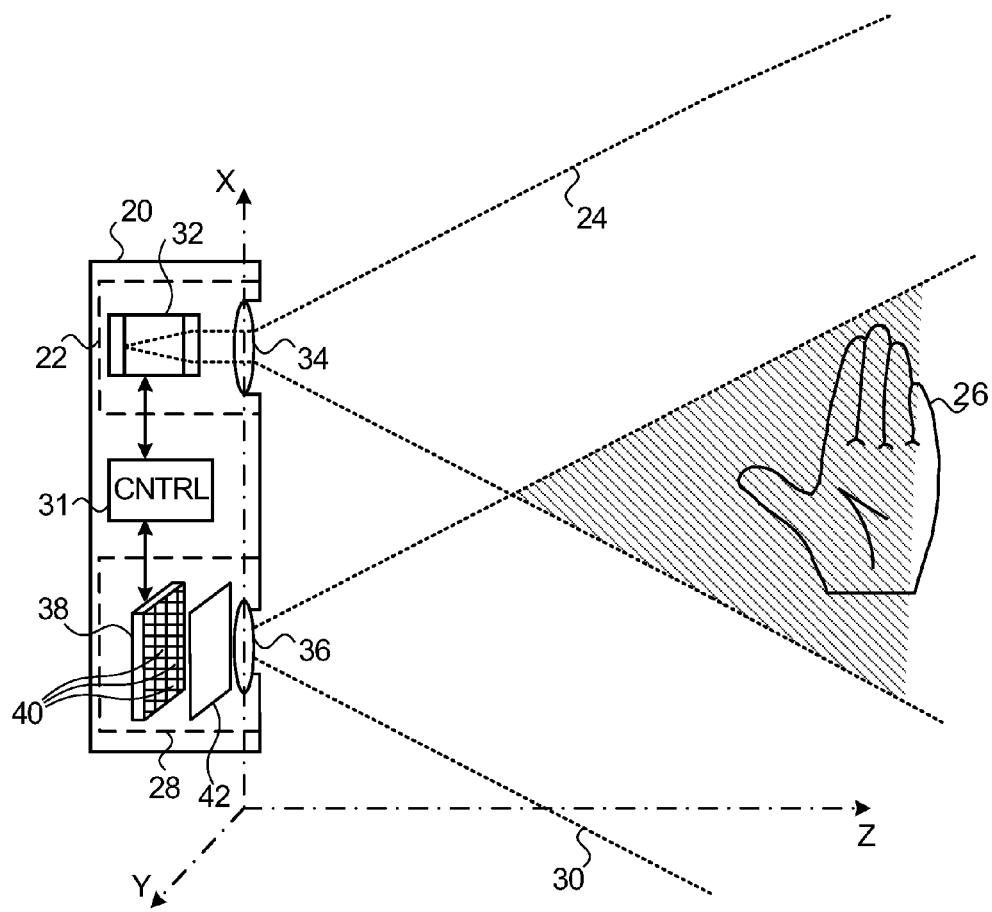
FIG. 1 is a schematic top view of an optical imaging device, in accordance with an embodiment of the present invention.

Ambient radiation interference is a problem in many computer vision systems. Such systems commonly operate by processing an image of interest. The image is formed on an image sensor by objective optics, which collect and focus optical radiation in a given wavelength range onto the image sensor plane. In many applications, the image of a scene is formed at a particular wavelength. In such applications, ambient background radiation collected from the scene at other wavelengths within the range of the objective optics tends to introduce spurious features and reduce the contrast (and hence reduce the quality) of the image captured by the image sensor. Systems that use projected radiation in a narrow wavelength band, such as 3D mapping and various sorts of laser scanning systems, tend to be particularly vulnerable to this sort of background interference.

Some systems use optical filters, such as interference filters, to block at least a portion of the incoming ambient radiation (as described in the above-mentioned US 2008/0240502, for example). The passband of such filters, however, is strongly dependent on the incident angle of the radiation on the filter. In other words, a narrowband interference filter that passes a target wavelength at normal incidence will typically block a ray of the same wavelength that is incident at a 10° angle, for example. When the filter is to be interposed in the path of focused radiation, the passband is generally made broad enough to pass the rays at the target wavelength over the full range of angles that is collected by the objective optics. Manufacturing tolerances on the filter passband (width and center wavelength) may result in further widening of the filter. The resultingly broad passband permits a substantial amount of ambient radiation to reach the image sensor, as well.

Embodiments of the present invention that are described hereinbelow address this problem by positioning a dispersive element in the optical path, so as to spread the optical radiation collected by the objective optics as a function of wavelength. For effective spreading, the inventors have found it advantageous to use a dispersive element that causes the optics to have a chromatic aberration in excess of one micrometer per nanometer of wavelength at the plane of the image sensor. In some designs, the resulting chromatic aberration may be still greater—in the range of 4-5 micrometers per nanometer, for example. As a result, each wavelength emanating from a given point in the object is focused to a different point with respect to the image sensor plane.

In some embodiments, the dispersive element causes different wavelengths in the range received by the optics to be focused along different, respective optical axes toward the plane of the image sensor (even though the objective optics by themselves focus all the wavelengths along a common optical axis). As a result, each individual wavelength remains sharply focused, but image features that appear over all or a large part of the range of incoming wavelengths will be smeared in the image sensor plane, since these wavelengths all have different focal axes.

Therefore, if the radiation emitted from an object in a scene imaged by the optics includes a narrowband feature at some target wavelength (such as a pattern of radiation projected onto and reflected from the object at the target wavelength), the image sensor will capture a sharp image of this feature. Broadband features, however, such as parts of the scene illuminated by ambient background radiation, will be spread over multiple pixels in the image, and therefore smeared. The effect of the dispersive element is thus equivalent to applying a low-pass filter to broadband (ambient) radiation, without significantly affecting the narrowband radiation at the target wavelength.

Other embodiments of the present invention use a strongly-dispersive focusing element to spread the focal points of the different wavelengths in the range. The focusing element is typically designed and positioned so that the target wavelength is focused sharply in the plane of the image sensor, while other wavelengths are focused to points ahead of or behind the plane. A diffractive optical element, such as a Fresnel lens, may be used effectively for this purpose, although refractive elements may also be used, provided they have sufficient chromatic dispersion. Thus, as in the embodiments described above, the image at the target wavelength is sharp, while broadband features are effectively low-pass filtered.

Although the embodiments described above and shown in the figures use either a dispersive spreading element or a dispersive focusing element, in alternative embodiments both types of dispersive elements may be used together in order to enhance the filtering effect.

SYSTEM DESCRIPTION

FIG. 1 is a schematic side view of an imaging system 20, in accordance with an embodiment of the present invention. A set of X-Y-Z axes is used in this figure and in parts of the description that follows to aid in understanding the orientation of the figures, wherein the X-Y plane is the frontal plane of system 20, and the Z-axis extends perpendicularly from this plane toward the scene. The choice of axes, however, is arbitrary and is made solely for the sake of convenience in describing embodiments of the invention.

An illumination assembly 22 projects a patterned radiation field 24 onto an object 26 (in this case a hand of a user of the system) in a scene. An imaging assembly 28 captures an image of the scene within a field of view 30. A controller 31 or other electronic processor processes the image in order to generate a 3D map of object 26 (also referred to as a "depth map"). Further details of this sort of mapping process are described, for example, in the above-mentioned US 2008/0240502 and in PCT International Publication WO 2007/105205, whose disclosure is also incorporated herein by reference. The 3D map of the user's hand (and/or other parts of the user's body) may be used in a gesture-based computer interface, but this sort of functionality is beyond the scope of the present patent application. Furthermore, the principles and benefits of the embodiments described below are not limited to this sort of system, but may rather be applied in substantially any context in which narrowband features are to be imaged against a broadband background.

Illumination assembly 22 comprises a projection module 32, which generates a beam of patterned radiation, and projection optics 34, which project the beam onto field 24. Module 32 comprises a narrowband radiation source, such as a laser diode, which emits optical radiation to generate the beam at a target wavelength. In a typical embodiment, the radiation source in module 32 emits near-infrared radiation, but the principles of the present invention are equally applicable to target wavelengths in any part of the optical spectrum.

The term "optical radiation," as used in the context of the present patent application and in the claims, refers to any or all of visible, infrared and ultraviolet radiation, and is used interchangeably with the term "light." The bandwidth of the radiation source in module 32 may be in the range of 1 nm or less, typically up to about 10 nm, depending on application requirements; and the term "target wavelength" is used in the present description and in the claims to refer to the center wavelength of the emitted radiation band. The term "narrowband" is used in a relative sense, to refer to the narrow bandwidth of the object features of interest (such as the bandwidth of the radiation source in module 32) relative to the ambient background radiation, which typically extends over a band of hundreds of nanometers. The terms "ambient" and "background" are used to refer to radiation in the scene that is outside the narrow band of interest.

Imaging assembly 28 comprises objective optics 36, which form an optical image of the scene containing object 26 onto an image sensor 38, such as a CMOS integrated circuit image sensor. The image sensor comprises an array of sensor elements 40, as is known in the art. The sensor elements generate respective signals in response to the radiation focused onto them by optics 36, wherein the pixel value of each pixel in the electronic images output by image sensor 38 corresponds to the signal from a respective sensor element 40. A dispersive element 42 is positioned to spread the optical radiation collected by objective optics 36, as described in detail with reference to the figures that follow.

Embodiment I—Dispersive Beam Spreading

Figure 2:
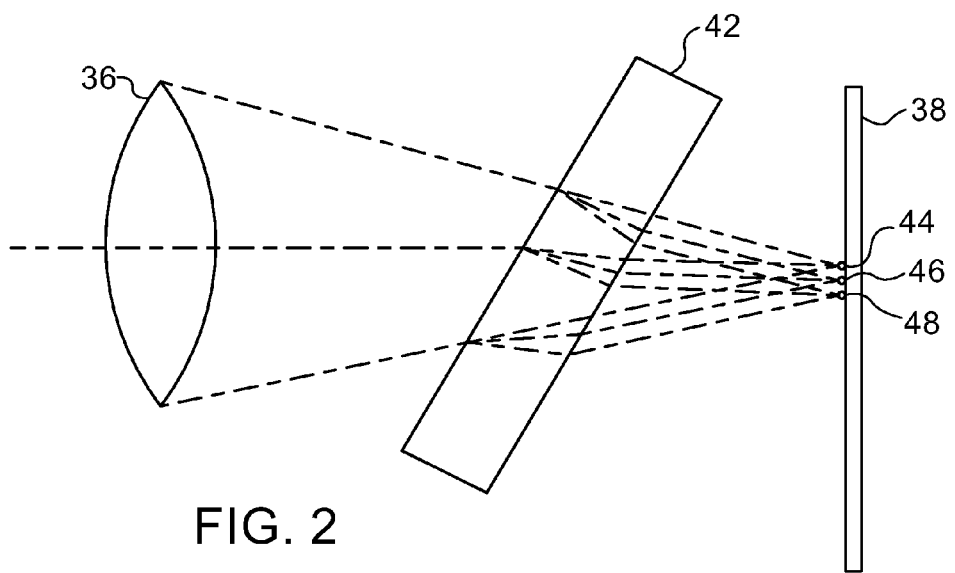
FIG. 2 is a schematic side view of an imaging assembly with a dispersive element, in accordance with an embodiment of the present invention.

FIG. 2 is a schematic side view of imaging assembly with dispersive element 42, in accordance with an embodiment of the present invention. Element 42 may comprise any suitable type of dispersive optical component and dispersive material. For example, element 42 may comprise a refractive element, such as a slab of a dispersive type of vitreous material, such as flint glass, or crystalline material, inclined at an angle as shown in the figure so that rays of different wavelengths are refracted in the material at different angles. As another example, element 42 may comprise a dispersive prism. As yet another example (described below in greater detail with reference to FIG. 4), element 42 may comprise a diffractive element, such as a grating. Alternatively, other types of dispersive elements may be used for the purposes of this embodiment and are considered to be within the scope of the present invention. In any case, as noted earlier, it is desirable for good wavelength separation that the dispersive element introduce chromatic aberration of at least one micrometer of focal shift per nanometer of wavelength. Although element 42 is shown in the figures as a transmissive element, assembly 28 may alternatively comprise a reflective dispersive element, such as a diffraction grating operating in a reflective mode.

Optics 36 in assembly 28 focus incoming radiation over a broad band along a common optical axis, as shown in FIG. 2. Dispersion in element 42, however, causes different wavelengths in the range collected by optics 36 to be shifted and thus focused along different, respective optical axes toward the plane of image sensor 38. As a result, each wavelength in a given broadband ray is focused to a different, respective focal point 44, 46, 48 in the sensor plane. The optics shown in this figure are greatly simplified in order to demonstrate the principles of the embodiment with conceptual clarity.

Figure 4:
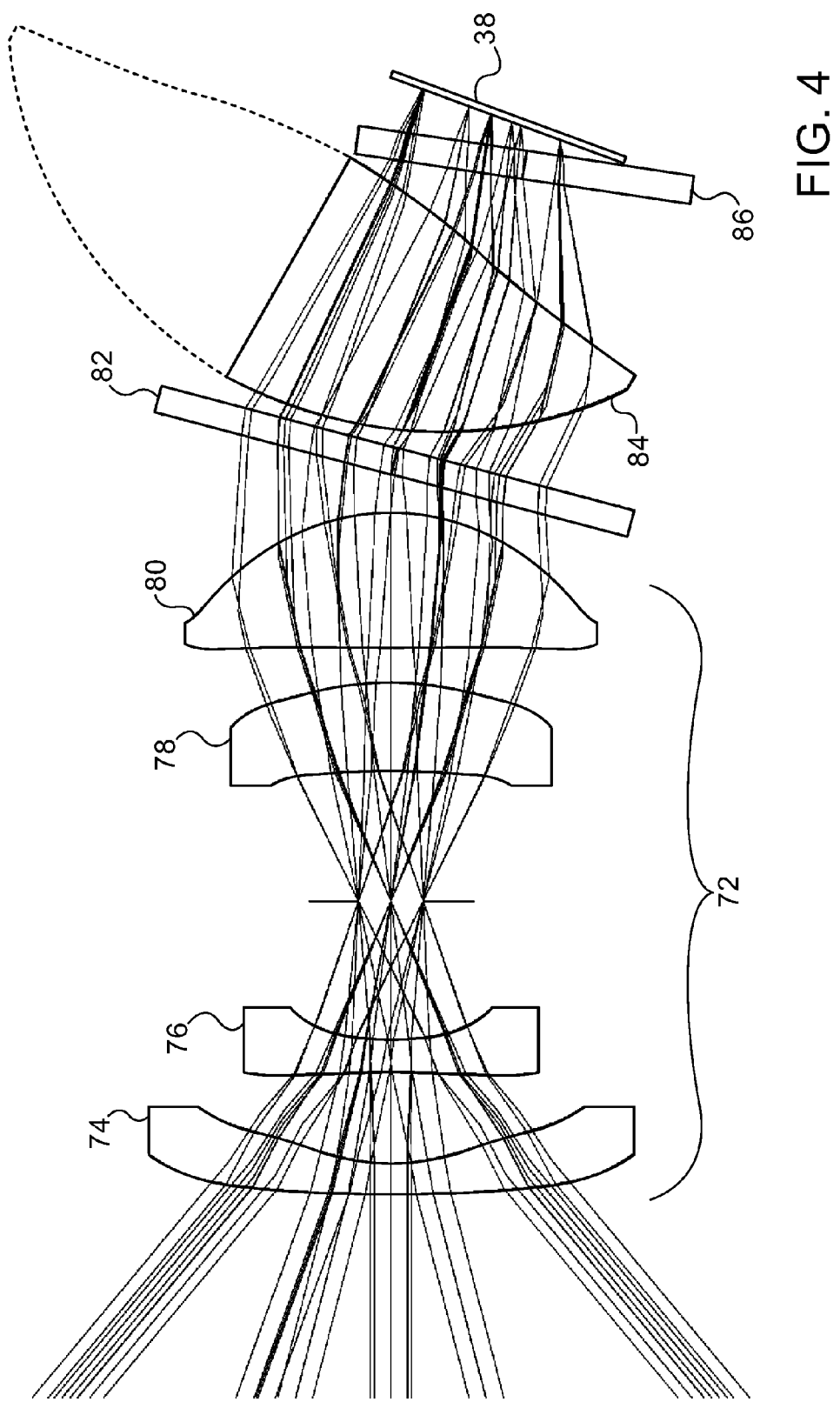
FIG. 4 is a schematic side view of an imaging assembly with a dispersive element, in accordance with another embodiment of the present invention.

In particular, placement of dispersive element 42 in a location at which the rays from optics 36 are converging, as shown in FIG. 2, introduces focal aberrations that should desirably be corrected by another optical element or elements (not shown). Such aberrations may be alleviated by placing the dispersive element at a location in the optical path in which the rays are approximately collimated. One such configuration is shown in FIG. 4. As another alternative, the dispersive element may be placed ahead of the objective optics, i.e., between the object and the first focusing element of the optics. The dispersive element in this sort of embodiment may be fabricated, for example, as a dome (with suitable refractive and/or diffractive properties) or may comprise one or more slabs and/or prisms of dispersive material.

As a result of the dispersion introduced by element 42 (or by other types of dispersive elements, as noted above), a fine feature in a broadband image formed by optics 36 will be focused to point 44 for one wavelength and to point 48 for another wavelength, for example. Since image sensor 38 is sensitive to the entire wavelength range, this feature will be smeared over multiple pixels in the electronic image that is output by the image sensor. Dispersive element 42 thus acts as a low-pass filter with respect to broadband image features. On the other hand, a fine feature in a narrowband image will be focused to a single focal point 46 and will therefore remain sharply-focused in the electronic image notwithstanding the shift caused by dispersive element 42.

Figure 3A:
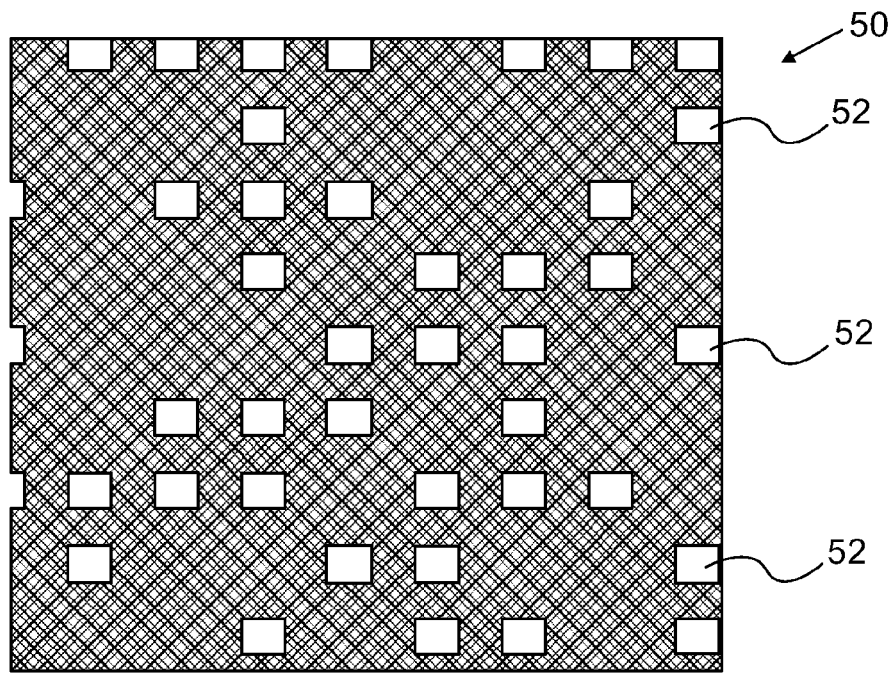
FIG. 3A is a schematic representation of a projected pattern of optical radiation.
Figure 3B:
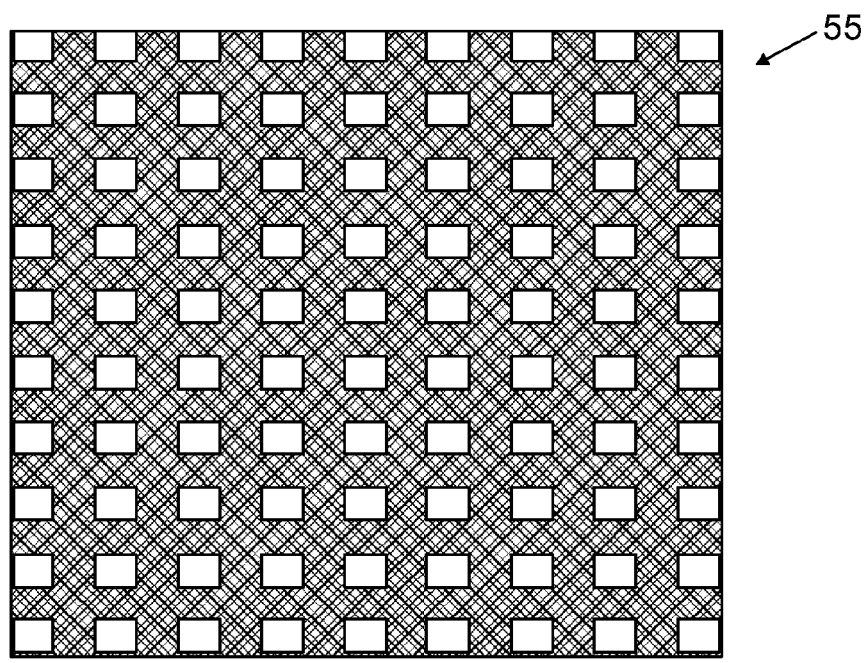
FIG. 3B is a schematic representation of a pattern of background radiation.

FIGS. 3A-D are schematic representations of images that illustrate the effect of dispersive element 42, in accordance with an embodiment of the present invention. FIG. 3A shows a projected pattern 50 of narrowband optical radiation, comprising bright spots 52 against a dark background. Projection assembly 22 (FIG. 1) may project a pattern of this sort onto object 26. At the same time, broadband ambient radiation in the area of object 26 creates a background image 55, shown in FIG. 3B, which is captured by optics 36 along with the narrowband pattern. For the sake of illustration, the background image is taken to be an arbitrary pattern of bright features against a dark background, but the principles of the embodiments disclosed herein are equally applicable to any sort of sharp features in a broadband image.

Figure 3C:
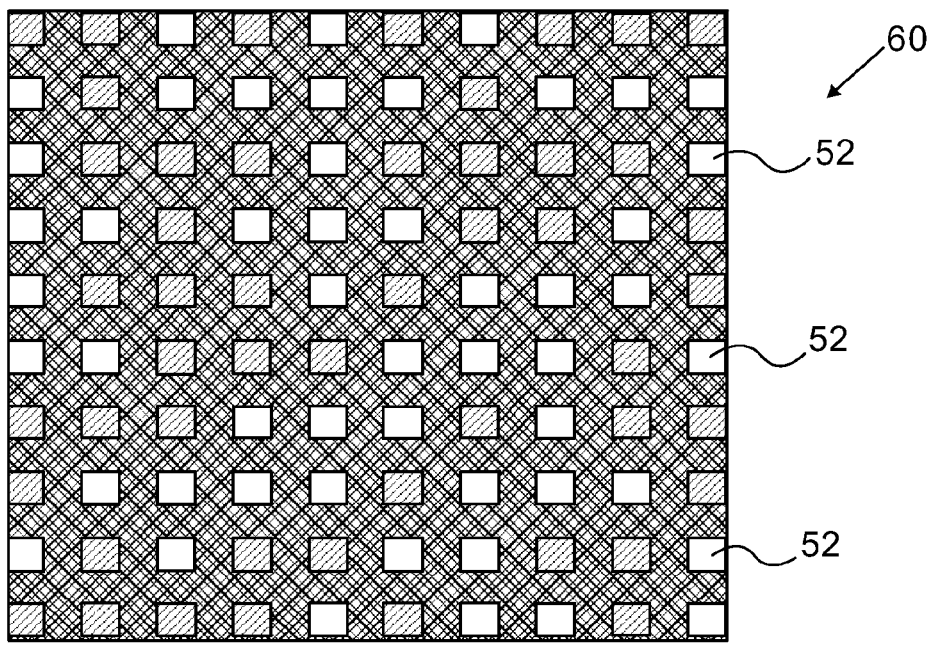
FIG. 3C is a schematic representation of an image of the pattern of FIG. 3A that is captured in the presence of the background radiation of FIG. 3B.

FIG. 3C shows an image 60 that would be captured by image sensor 38 in the absence of dispersive element 42. Bright spots 52 from pattern 50 are mixed with features of background image 55. Although spots 52 are distinguished in FIG. 3C from the parts of pattern 55, in practice the background image on image sensor 38 may be as bright as or brighter than the pattern image. As a result, controller 31 may have difficulty in processing the image to distinguish between the pattern and the background.

Figure 3D:
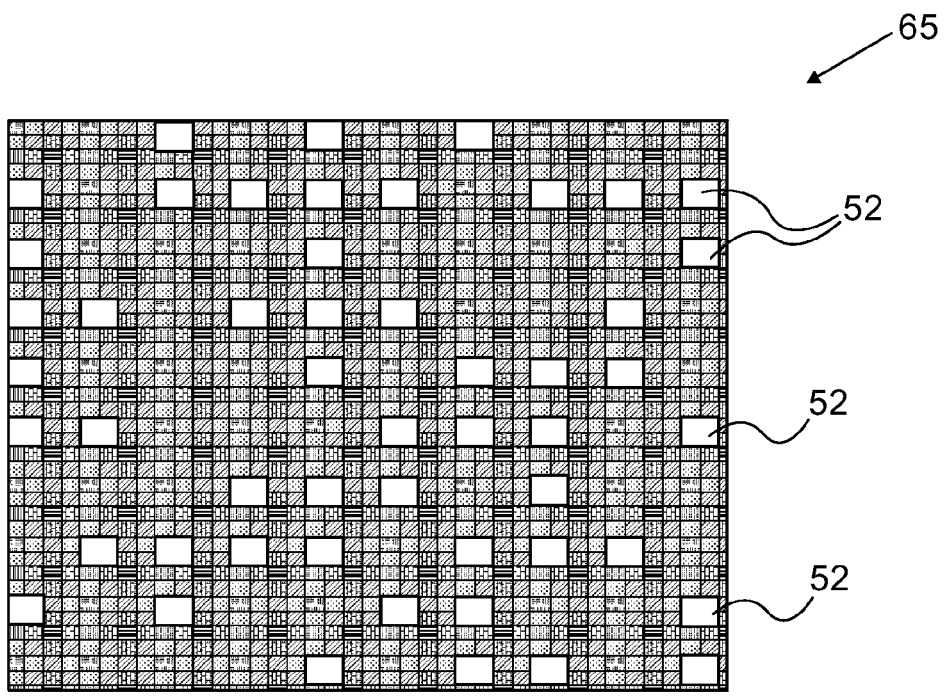
FIG. 3D is a schematic representation of an image of the pattern of FIG. 3A that is captured in the presence of the background radiation of FIG. 3B using dispersive filtering of the background radiation, in accordance with an embodiment of the present invention.

FIG. 3D shows an image 65 of the pattern that is captured by image sensor when dispersive element 42 is used to filter background image 55. Now the features of the background image are spread over many pixels and are therefore blurred in image 65. Narrowband spots 52, however, remain in sharp focus. Although the background radiation from image 55 causes some reduction in the contrast of spots 52 in image 65, controller 31 can readily distinguish these spots from the background features and thus reject the interference caused by the background radiation.

FIG. 4 is a schematic side view of an imaging assembly 70 with a dispersive filtering element 82, in accordance with another embodiment of the present invention. This assembly may be used in place of imaging assembly 28 in system 20 (FIG. 1). Detailed design parameters of assembly 70 are presented below in an Appendix.

Objective optics 72 in assembly 70 comprise plastic, axially-symmetrical aspheric lenses 74, 76, 78, 80. These elements together act as a field reducer, as well as a telecentric objective. The chief rays of all fields are nearly collimated at the exit from objective optics 72, while the rays inside each field are slightly tilted around the chief rays by angles that depend on the F-number of the design.

Element 82 is a linear transmissive diffraction grating, tilted at the Littrow angle relative to the optical axis of objective optics 72. The diffraction grating causes different wavelength to be diffracted at different angles according to the grating equation $\sin \alpha + \sin \beta = \lambda/d$, wherein $\alpha$ is the incident angle, $\beta$ is the diffraction angle, $\lambda$ is the light wavelength, and $d$ is the grating period. The Littrow incidence angle is defined as the angle for which $2 \sin \alpha = \lambda/d$. When used at the Littrow angle, the diffraction grating generally has maximal efficiency, meaning that most of the incoming light is directed into a single diffraction order (typically the −1 order). The grating may be blazed, as is known in the art, to optimize this efficiency.

The rays exiting from the diffraction grating are tilted and focused by an aspheric wedged lens 84 onto image sensor 38. As shown in FIG. 4, the wedged lens focuses the optical radiation with a tilt that is opposite to the tilt of element 82. For ease of fabrication, the wedged lens may comprise, for example, an off-axis section of an axially-symmetrical lens, as illustrated in the figure. An interference filter 86 may be used to block radiation that is far from the target wavelength, as well as blocking stray orders of the diffraction grating (orders other than −1 in the present example). Because of the sensitivity of filter 86 to angle of incidence, as explained above, the filter will block stray diffraction orders at the target wavelength (and other nearby wavelengths) while passing the desired order. Thus, interference filter 86 serves in this embodiment as an angular filter, in addition to its role in rejecting light outside its passband.

In an alternative embodiment, the position of filter 86 may be interchanged with wedged lens 84, and the filter will still able to perform its dual filtering function. In this case, grating 82 may be formed on the same substrate as filter 86, and the filter will then be able to perform both the dispersive and angular filtering functions. In such an embodiment, it is desirable that the grating be formed on the front surface of the filter, i.e., the surface that is more distant from image sensor 38.

As explained above, assembly 70 is designed to focus different wavelengths at a relative offset onto the plane of image sensor 38. Each wavelength is still imaged with good quality, and all wavelengths within the passband of the filter are in good focus at the same time on the plane of the image sensor, but they are shifted relative to one another. This effect causes broadband image features to smear in the direction of the shift (the direction of the grating operation, as shown in the figure), while the narrowband projected pattern is imaged with high contrast.

Element 82 will cause the location of the pattern in the image formed on image sensor 38 to shift according to the actual wavelength of projection module 32. This wavelength may vary due to manufacturing tolerances and temperature changes, for example. Controller 31 may be programmed to compensate for this shift.

Lenses 74, 76, 78, 80 may be produced as a single, rotationally-symmetrical assembly, which may be used to focus assembly 70 by rotational movement. The remaining elements of assembly 70 are not axially symmetrical, and are therefore typically assembled statically in a suitable holder.

Embodiment II—Dispersive Focusing

Figure 5:
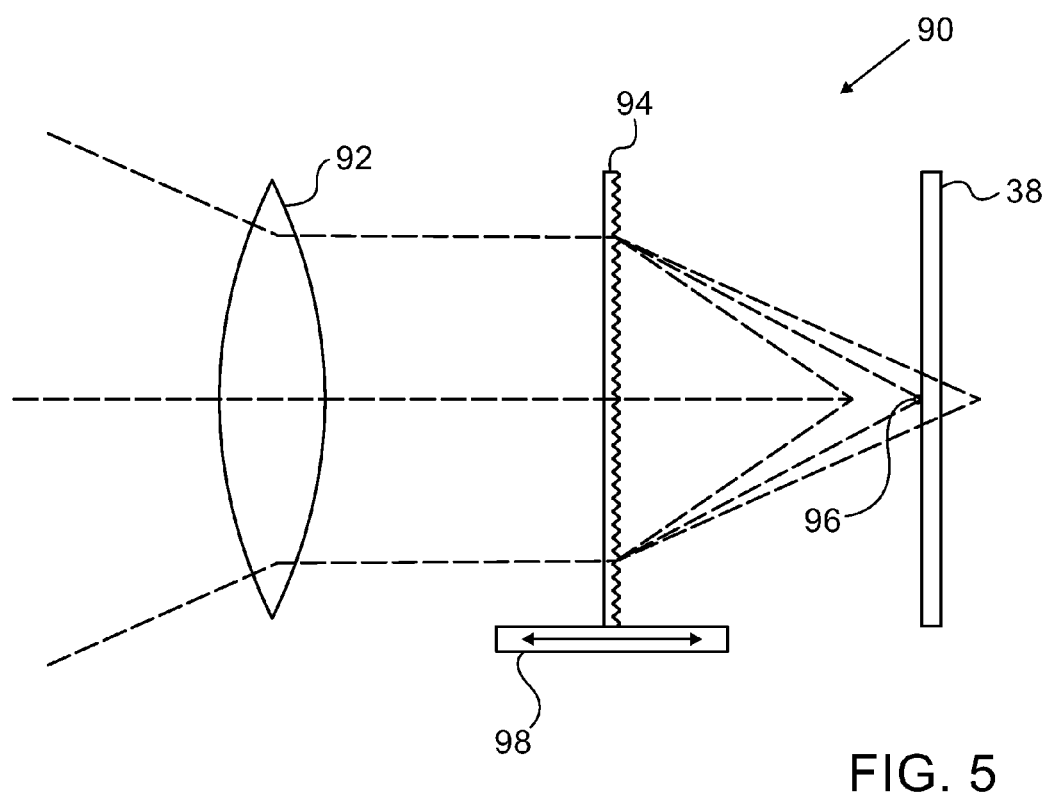
FIG. 5 is a schematic side view of an imaging assembly with a dispersive focusing element, in accordance with an embodiment of the present invention.

FIG. 5 is a schematic side view of an imaging assembly 90 with a dispersive focusing element 94, in accordance with an embodiment of the present invention. Assembly 90 may be used in place of assembly 28 in system 20, for example. Objective optics 92 in assembly 90 collect and focus optical radiation over a range of wavelengths along a common optical axis toward image sensor 38. Dispersive focusing element 94, however, focuses different wavelengths at different focal lengths, so that only the target wavelength has its focal point 96 in the plane of the image sensor. Other wavelengths are focused ahead of or behind the plane. Therefore, narrowband features at the target wavelength will be in sharp focus in the electronic image output by the image sensor, while broadband features, due to background radiation for example, will be smeared.

Dispersive focusing element 94 may, for example, comprise a diffractive lens, such as a Fresnel lens. The focal length of a diffractive lens is given as a function of wavelength by the formula $$= \frac{\lambda_0}{\lambda} f_0,$$

wherein $\lambda_0$ is the "design" wavelength, i.e., the wavelength at which the focal length of the lens is $f_0$. For diffractive lenses with aspheric behavior, some corrections may be introduced into the above formula, but the strongly dispersive behavior of the lens with wavelength is still present. To create an imaging optical system that focuses different wavelengths at different focal distance in this manner, it may be sufficient to replace one or more refractive surfaces of the optics (such as the last lens, as in assembly 90) with its diffractive counterpart. In any case, the optical system as a whole should be designed with a strong dependence of the overall focal length on element 95 in order to provide the desired wavelength separation. As in the preceding embodiments, it is desirable that the optics (including element 94) have a chromatic aberration in excess of one micrometer per nanometer of wavelength at the plane of image sensor 38.

The combined focal length of the hybrid refractive-diffractive optics shown in FIG. 5 changes with wavelength, thus achieving selective focusing of the target wavelength of the projected pattern onto the image sensor plane, while defocusing broadband background features. The amount of focal length variation of element 94 is chosen so as to provide sufficient focal sensitivity with wavelength for background filtering on the one hand, while leaving the entire bandwidth of the projected radiation in good focus on the other. The amount of focal variation is proportional to the focal length of the diffractive lens in the system, as seen in the above formula.

The overall assembly 90 may be designed with the defocusing trade-off in mind, so as to correct for possible diffractive aberrations and introduce the desired amount of wavelength sensitivity.

Because dispersive focusing element 94 is the last element in the optics before image sensor 38, element 94 can be refocused for any given target wavelength (within the design range). The focus may thus be adjusted for changes in the wavelength of projection module 32, as noted above. Wavelengths outside a narrow band around the target wavelength will be defocused and smeared. Alternatively, such refocusing may also be accomplished by suitable movement of a dispersive focusing element at another position within the optical train.

To facilitate the wavelength-dependent focusing, assembly 90 may comprise a motion mechanism 98, which adjusts the position of dispersive focusing element 94. Mechanism 98 may comprise, for example, a fine mechanical drive or a piezoelectric drive, or any other suitable type of mechanism that is known in the art. In this embodiment, mechanism 98 shifts the relative positions of element 94 and image sensor 38 in order to select the focal wavelength and to maintain focal stability in response to wavelength changes and other factors that may change during operation of assembly 90. Alternatively or additionally, mechanism 98 may be configured to shift the positions of one or more other elements of optics 92.

In other embodiments (not shown specifically in the figures) a similar sort of mechanism may be used to adjust and maintain wavelength stability in the sorts of axis-shifting embodiments that are shown in FIGS. 2 and 4.

Although the description of FIG. 5 above relates to a diffractive optical element, other types of dispersive focusing elements, such as a highly-dispersive refractive lens, may alternatively be used in assembly 90. Furthermore, dispersive focusing elements may be used in combination with dispersive filtering elements (such as element 42 or 82) for enhanced effect.

It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

APPENDIX—Optical Design Parameters

The parameters listed below provide details of the optical design shown in FIG. 4. The parameters were extracted from a design file generated by the ZEMAX® optical design software (ZEMAX Development Corporation, Bellevue, Wash.) that was used in creating and evaluating the design.

GENERAL LENS DATA:

Surfaces: 24
Stop: 6
System Aperture: Float By Stop Size = 0.797
Glass Catalogs: PLASTIC B-SYSTEM
Ray Aiming: Real Reference, Cache On
X Pupil shift: 0
Y Pupil shift: 0
Z Pupil shift: 0
X Pupil compress: 0

-continued

Y Pupil compress: 0
Apodization: Uniform, factor = 0.00000E+000
Temperature (C.): 2.00000E+001
Pressure (ATM): 1.00000E+000
Adjust Index Data To Environment: Off
Effective Focal Length: 2.319484 (in air at system
temperature and pressure)
Effective Focal Length : 2.319484 (in image space)
Back Focal Length: 1.842413
Total Track: 32.02137
Image Space F/#: 2.915449
Paraxial Working F/#: 2.915448
Working F/#: 2.701257
Image Space NA: 0.1690324
Object Space NA: 2.673263e−007
Stop Radius: 0.797
Paraxial Image Height: 1.932521
Paraxial Magnification: −1.558752e−006
Entrance Pupil Diameter: 0.7955839
Entrance Pupil Position: 8.985321
Exit Pupil Diameter: 3.55047
Exit Pupil Position: 9.209573
Field Type: Angle in degrees
Maximum Radial Field: 60.07529
Primary Wavelength: 0.83 μm
Lens Units: Millimeters
Angular Magnification: −0.2828611

Fields: 12
Field Type: Angle in degrees

| # | X-Value | Y-Value | Weight |
|---|---|---|---|
| 1 | 0.000000 | 0.000000 | 1.000000 |
| 2 | 12.000000 | 0.000000 | 3.000000 |
| 3 | 0.000000 | 14.500000 | 5.000000 |
| 4 | 0.000000 | −14.500000 | 3.000000 |
| 5 | 24.000000 | 0.000000 | 3.000000 |
| 6 | 0.000000 | 39.800000 | 4.000000 |
| 7 | 0.000000 | −39.800000 | 2.000000 |
| 8 | 45.000000 | 0.000000 | 8.000000 |
| 9 | 45.000000 | −39.800000 | 3.000000 |
| 10 | 45.000000 | 39.800000 | 3.000000 |
| 11 | 22.500000 | −19.900000 | 1.000000 |
| 12 | 22.500000 | −19.900000 | 1.000000 |

Vignetting Factors

| # | VDX | VDY | VCX | VCY | VAN |
|---|---|---|---|---|---|
| 1 | 0.000000 | 0.000000 | 0.000000 | 0.000000 | 0.000000 |
| 2 | 0.000000 | 0.000000 | 0.000000 | 0.000000 | 0.000000 |
| 3 | 0.000000 | 0.000000 | 0.000000 | 0.000000 | 0.000000 |
| 4 | 0.000000 | 0.000000 | 0.000000 | 0.000000 | 0.000000 |
| 5 | 0.000000 | 0.000000 | 0.000000 | 0.000000 | 0.000000 |
| 6 | 0.000000 | 0.000000 | 0.000000 | 0.000000 | 0.000000 |
| 7 | 0.000000 | 0.000000 | 0.000000 | 0.000000 | 0.000000 |
| 8 | 0.000000 | 0.000000 | 0.000000 | 0.000000 | 0.000000 |
| 9 | 0.000000 | 0.000000 | 0.000000 | 0.000000 | 0.000000 |
| 10 | 0.000000 | 0.000000 | 0.000000 | 0.000000 | 0.000000 |
| 11 | 0.000000 | 0.000000 | 0.000000 | 0.000000 | 0.000000 |
| 12 | 0.000000 | 0.000000 | 0.000000 | 0.000000 | 0.000000 |

Wavelengths: 1
Units: μm

| # | Value | Weight |
|---|---|---|
| 1 | 0.830000 | 1.000000 |

SURFACE DATA SUMMARY:

| Surf | Type | Radius | Thickness | Glass | Diameter |
|---|---|---|---|---|---|
| OBJ | STANDARD | Infinity | 1488030 | 3873671 | 0 |
| 1 | STANDARD | Infinity | 5 | 27.30599 | 0 |
| 2 | EVENASPH | 48.87732 | 0.7494415 | E48R-BS | 11.88 |
| 3 | EVENASPH | 4.623508 | 2.246475 | | 9.48 −1.353716 |

-continued

| | | | | | | |
|---|---|---|---|---|---|---|
| 4 | EVENASPH | −33.61659 | 0.7992448 | E48R-BS | 7.2 | |
| 5 | EVENASPH | 7.473258 | 3.387089 | | 4.96 | 0 |
| STO | STANDARD | Infinity | 3.205891 | | 1.594 | 0 |
| 7 | EVENASPH | −17.68054 | 2.168681 | E48R-BS | 5.88 | |
| 8 | EVENASPH | −6.876255 | 0.8340925 | | 7.86 | −2.255111 |
| 9 | EVENASPH | 99.57123 | 3.328151 | E48R-BS | 10.1 | |
| 10 | EVENASPH | −5.335159 | 0.9305261 | | 10.1 | −4.524261 |
| 11 | COORDBRK | — | 0 | — | — | — |
| 12 | STANDARD | Infinity | 0.67 | POLYCARB | 12 | |
| 13 | DGRATING | Infinity | 0 | | 12 | 0 |
| 14 | COORDBRK | — | 1.753535 | — | — | — |
| 15 | COORDBRK | — | 0 | — | — | — |
| 16 | EVENASPH | 10.02237 | 6.186684 | E48R-BS | 17.4 | |
| 17 | EVENASPH | −12.99827 | 0 | | 17.4 | 0 |
| 18 | COORDBRK | — | −0.5455667 | — | — | — |
| 19 | COORDBRK | — | 0 | — | — | — |
| 20 | STANDARD | Infinity | 0.7 | | 1.800000 | 35.000000 |
| 21 | STANDARD | Infinity | −0.7 | | 7.989695 | 0 |
| 22 | COORDBRK | — | 0.7 | — | — | — |
| 23 | STANDARD | Infinity | 0.6071292 | | 8.284734 | 0 |
| IMA | TILTSURF | — | 6.447033 | — | | |

| Surf | Conic | Comment |
|---|---|---|
| OBJ | | |
| 1 | | |
| 2 | 0 | |
| 3 | | |
| 4 | 0 | |
| 5 | | |
| STO | | |
| 7 | 0 | |
| 8 | | |
| 9 | 0 | |
| 10 | | |
| 11 | Element | Tilt |
| 12 | 0 | |
| 13 | | |
| 14 | Element | Tilt |
| 15 | Element | Tilt |
| 16 | 0 | |
| 17 | | |
| 18 | Element | Tilt |
| 19 | Element | Tilt |
| 20 | 8.308056 | 0 |
| 21 | | |
| 22 | Element | Tilt |
| 23 | Dummy | |
| IMA | | |

The invention claimed is:

1. Optical apparatus, comprising:
an image sensor;
objective optics, which are configured to collect and focus optical radiation over a range of wavelengths along a common optical axis toward a plane of the image sensor;
a dispersive element, which is positioned to spread the optical radiation collected by the objective optics so that different wavelengths in the range are focused along different, respective optical axes toward the plane, wherein the dispersive element comprises a diffractive element, which comprises a grating configured to direct a selected diffraction order onto the image sensor; and
an interference filter positioned between the grating and the image sensor so as to block stray diffraction orders, other than the selected diffraction order, from reaching the image sensor.

2. The apparatus according to claim 1, wherein the dispersive element is configured to cause the image sensor to capture a sharp image of the optical radiation emitted from an object at a target wavelength within the range, while spreading broadband background radiation within the range across the plane.

3. The apparatus according to claim 2, and comprising a projection assembly, which is configured to project the optical radiation at the target wavelength onto the object, so that the emitted optical radiation collected by the objective comprises the projected optical radiation that is reflected from the object.

4. The apparatus according to claim 3, wherein the projected optical radiation comprises a predetermined radiation pattern, and wherein the sharp image captured by the image sensor comprises an image of the pattern projected onto the object.

5. The apparatus according to claim 2, and comprising a processor, which is configured to process the sharp image captured by the image sensor while rejecting interference caused by the background radiation.

6. The apparatus according to claim 5, wherein the processor is configured to construct a 3D map of the object by processing the sharp image.

7. The apparatus according to claim 1, wherein the dispersive element is configured so that the optical radiation is focused with a chromatic aberration in excess of one micrometer per nanometer of wavelength at the plane of the image sensor.

8. Optical apparatus, comprising:
an image sensor;
objective optics, which are configured to collect and focus optical radiation over a range of wavelengths along a common optical axis toward a plane of the image sensor;
a dispersive element, which is positioned to spread the optical radiation collected by the objective optics so that different wavelengths in the range are focused along different, respective optical axes toward the plane,
wherein the dispersive element has a first tilt relative to the optical axis, and wherein the apparatus comprises a wedged lens, which is configured to focus the optical radiation with a second tilt, opposite to the first tilt.

9. The apparatus according to claim 8, wherein the wedged lens comprises a section of an axially-symmetrical lens.

10. The apparatus according to claim 8, wherein the dispersive element is configured to cause the image sensor to capture a sharp image of the optical radiation emitted from an object at a target wavelength within the range, while spreading broadband background radiation within the range across the plane.

11. The apparatus according to claim 10, and comprising a projection assembly, which is configured to project the optical radiation at the target wavelength onto the object, so that the emitted optical radiation collected by the objective comprises the projected optical radiation that is reflected from the object.

12. The apparatus according to claim 11, wherein the projected optical radiation comprises a predetermined radiation pattern, and wherein the sharp image captured by the image sensor comprises an image of the pattern projected onto the object.

13. The apparatus according to claim 10, and comprising a processor, which is configured to process the sharp image captured by the image sensor while rejecting interference caused by the background radiation.

14. The apparatus according to claim 13, wherein the processor is configured to construct a 3 D map of the object by processing the sharp image.

15. A method for imaging, comprising:
collecting and focusing optical radiation over a range of wavelengths along a common optical axis toward a plane of an image sensor;
positioning a dispersive element to spread the collected optical radiation so that different wavelengths in the range are focused along different, respective optical axes toward the plane,
wherein the dispersive element comprises a diffractive element, which comprises a grating, and wherein positioning the dispersive element comprises configuring the grating to direct a selected diffraction order onto the image sensor; and
positioning an interference filter between the grating and the image sensor so as to block stray diffraction orders, other than the selected diffraction order, from reaching the image sensor.

16. The method according to claim 15, wherein positioning the dispersive element causes the image sensor to capture a sharp image of the optical radiation emitted from an object at a target wavelength within the range, while spreading broadband background radiation within the range across the plane.

17. The method according to claim 16, and comprising projecting the optical radiation at the target wavelength onto the object, so that the optical radiation emitted from the object comprises the projected optical radiation that is reflected from the object.

18. The method according to claim 17, wherein the projected optical radiation comprises a predetermined radiation pattern, and wherein the sharp image captured by the image sensor comprises an image of the pattern projected onto the object.

19. The method according to claim 16, and comprising processing the sharp image captured by the image sensor while rejecting interference caused by the background radiation.

20. The method according to claim 19, wherein processing the sharp image comprises constructing a 3D map of the object by processing the sharp image.

21. The method according to claim 15, wherein the dispersive element is configured so that the optical radiation is focused with a chromatic aberration in excess of one micrometer per nanometer of wavelength at the plane of the image sensor.

22. A method for imaging, comprising:
collecting and focusing optical radiation over a range of wavelengths along a common optical axis toward a plane of an image sensor; and
positioning a dispersive element to spread the collected optical radiation so that different wavelengths in the range are focused along different, respective optical axes toward the plane,
wherein positioning the dispersive element comprises applying to the dispersive element a first tilt relative to the optical axis, and wherein collecting and focusing the optical radiation comprises positioning a wedged lens to focus the optical radiation with a second tilt, opposite to the first tilt.

23. The method according to claim 22, wherein the wedged lens comprises a section of an axially-symmetrical lens.

24. The method according to claim 22, wherein positioning the dispersive element causes the image sensor to capture a sharp image of the optical radiation emitted from an object at a target wavelength within the range, while spreading broadband background radiation within the range across the plane.

25. The method according to claim 24, and comprising projecting the optical radiation at the target wavelength onto the object, so that the optical radiation emitted from the object comprises the projected optical radiation that is reflected from the object.

26. The method according to claim 25, wherein the projected optical radiation comprises a predetermined radiation pattern, and wherein the sharp image captured by the image sensor comprises an image of the pattern projected onto the object.

27. The method according to claim 24, and comprising processing the sharp image captured by the image sensor while rejecting interference caused by the background radiation.

28. The method according to claim 27 wherein processing the sharp image comprises constructing a 3D map of the object by processing the sharp image.

29. A method for imaging, comprising:
projecting optical radiation at a target wavelength onto an object;
collecting and focusing the optical radiation reflected from the object, along with background radiation over a range of wavelengths, toward a plane of an image sensor;
positioning a dispersive element to direct the collected optical radiation so as to form a sharp image of the optical radiation at the target wavelength in the plane of the image sensor, while spreading the background radiation across the plane, wherein positioning the dispersive element comprises shifting a position of the dispersive element relative to the plane so as to select the target wavelength that is to be imaged sharply in the plane; and processing the sharp image captured by the image sensor while rejecting interference caused by the background radiation.

30. The method according to claim 29, wherein the projected optical radiation comprises a predetermined radiation pattern, and wherein the sharp image captured by the image sensor comprises an image of the pattern projected onto the object, and wherein processing the image comprises constructing a 3D map of the object by processing the sharp image.

31. The method according to claim 29, wherein positioning the dispersive element comprises spreading the optical radiation collected by the optics so that different wavelengths in the range are focused along different, respective optical axes toward the plane of the image sensor.

32. The method according to claim 29, wherein the dispersive element is configured so that the optics have a chromatic aberration in excess of one micrometer per nanometer of wavelength at the plane of the image sensor.

* * * * *